(12) United States Patent
Henty

(10) Patent No.: US 9,384,886 B2
(45) Date of Patent: Jul. 5, 2016

(54) TABLET COMPUTER STAND WITH NEAR FIELD COUPLING ENHANCEMENT AND COMBINED STAND KEYBOARD SYSTEM

(71) Applicant: David L. Henty, Newport Beach, CA (US)

(72) Inventor: David L. Henty, Newport Beach, CA (US)

(73) Assignee: EZERO TECHNOLOGIES LLC, Irvine, CA (US)

( * ) Notice: Subject to any disclaimer, the term of this patent is extended or adjusted under 35 U.S.C. 154(b) by 284 days.

(21) Appl. No.: 13/888,217

(22) Filed: May 6, 2013

(65) Prior Publication Data

US 2013/0293430 A1  Nov. 7, 2013

Related U.S. Application Data

(60) Provisional application No. 61/643,132, filed on May 4, 2012.

(51) Int. Cl.
*H01F 38/14* (2006.01)
*H01Q 1/22* (2006.01)
*H04B 5/00* (2006.01)

(52) U.S. Cl.
CPC ............ *H01F 38/14* (2013.01); *H01Q 1/2258* (2013.01); *H04B 5/0081* (2013.01)

(58) Field of Classification Search
USPC .................. 345/168; 341/20, 22; 361/379.06, 361/679.27–679.29, 679.55
See application file for complete search history.

(56) References Cited

U.S. PATENT DOCUMENTS

| | | |
|---|---|---|
| 7,006,014 B1 | 2/2006 | Henty |
| 7,027,039 B1 | 4/2006 | Henty |
| 8,905,317 B1 * | 12/2014 | Hsu et al. ...................... 235/492 |
| 2005/0162821 A1 * | 7/2005 | Homer et al. ................. 361/683 |
| 2011/0156966 A1 * | 6/2011 | Taniguchi et al. ............ 343/702 |
| 2012/0224316 A1 * | 9/2012 | Shulenberger ........... 361/679.09 |
| 2012/0243149 A1 * | 9/2012 | Gartrell et al. ........... 361/679.01 |
| 2013/0084796 A1 * | 4/2013 | Kerr ................................ 455/39 |
| 2013/0135810 A1 * | 5/2013 | Tseng et al. ............. 361/679.27 |
| 2013/0174401 A1 * | 7/2013 | Brogan et al. .................. 29/428 |
| 2013/0329351 A1 * | 12/2013 | Lin ........................... 361/679.27 |
| 2014/0043743 A1 * | 2/2014 | Liang ....................... 361/679.09 |
| 2014/0092543 A1 * | 4/2014 | Yang et al. ............... 361/679.08 |
| 2014/0203988 A1 | 7/2014 | Yang et al. |
| 2014/0320353 A1 * | 10/2014 | Lin et al. ....................... 343/702 |

* cited by examiner

*Primary Examiner* — Sarah McPartlin

(57) ABSTRACT

A tablet stand is disclosed which incorporates a near field antenna configuration which couples to a near field antenna in the back of a tablet and provides a near field antenna coupling region for near field communication at the front of the tablet. The stand may be completely passive and use conductive antenna elements and passive resonance matching circuit elements to provide efficient coupling. In another aspect a thin profile passive keyboard adapted for use with a near field enabled tablet is provided. In another aspect a mounting bracket or holder, embedded antenna, and passive keyboard combination is provided adapted for converting a tablet into a notebook type configuration.

11 Claims, 7 Drawing Sheets

TABLET COMPUTER STAND WITH NEAR FIELD COUPLING ENHANCEMENT AND COMBINED STAND KEYBOARD SYSTEM

RELATED APPLICATION INFORMATION

The present application claims priority under 35 U.S.C. Section 119(e) to U.S. Provisional Patent Application Ser. No. 61/643,132 filed May 4, 2012, the disclosure of which is incorporated herein by reference in its entirety.

BACKGROUND OF THE INVENTION

Tablet computers typically have a majority of surface area devoted to a touch screen of some type while having different form factors, screen sizes and boundary regions around the screen. At the same time multiple wireless communication capabilities are desired with related antennas incorporated into the tablet structure. One such communication capability of interest is near field communication for short range communication using inductive or magnetic coupling. Depending on the specific tablet design and near field antenna design it may be necessary or convenient to place the near field antenna at the back of the tablet. Due to the short range nature of near field communication and depending on the material employed in the tablet screen and specific antenna location, near field communication may require bringing the object to be communicated with to the back of the tablet adjacent the near field antenna. While this may be perfectly acceptable during normal handheld use it may become problematic when the tablet is placed in a stand. Also, communicating with devices adapted for front side use may be impossible.

SUMMARY OF THE INVENTION

In a first aspect the present invention provides a stand for a portable device having a near field communication capability and antenna. The stand comprises a first section having a device support surface adapted to receive a back portion of the portable device, the first section having a first portion of a passive near field communication antenna, a second section having a second portion of the passive near field communication antenna, and a third section connected to the first or second section. The sections are configurable to form a stand configuration having an angled side view with an angled device support surface.

In another aspect the present invention provides a stand for a portable device having a near field communication capability and antenna, comprising a stand section having an angled device support surface adapted to receive a back portion of the portable device and a movable section configurable from a position behind the support surface of the stand section to a position extending beyond the front of the support surface and having a passive near field communication antenna adapted to resonantly couple to the portable device antenna.

In another aspect the present invention provides a keyboard adapted for near field communication, comprising a metallic substrate portion adapted to support thin profile keys, a keyboard near field communication antenna, and a ferrite material forming part of the keyboard near field communication antenna or configured adjacent thereto.

Further aspects the present invention are described in the following sections.

DETAILED DESCRIPTION OF THE INVENTION

In a first aspect a tablet stand is provided which incorporates a near field antenna configuration which couples to a near field antenna in the back of a tablet and provides a near field antenna coupling region for near field communication at the front of the tablet. The stand may be completely passive and use conductive antenna elements and passive resonance matching circuit elements to provide efficient coupling. In another aspect a tablet stand and passive keyboard combination adapted for use with a near field enabled tablet is provided. In another aspect a rotatable mounting bracket with embedded antenna, near field enabled tablet, and passive keyboard combination is provided adapted for converting the tablet into a notebook type configuration.

Figure 1:
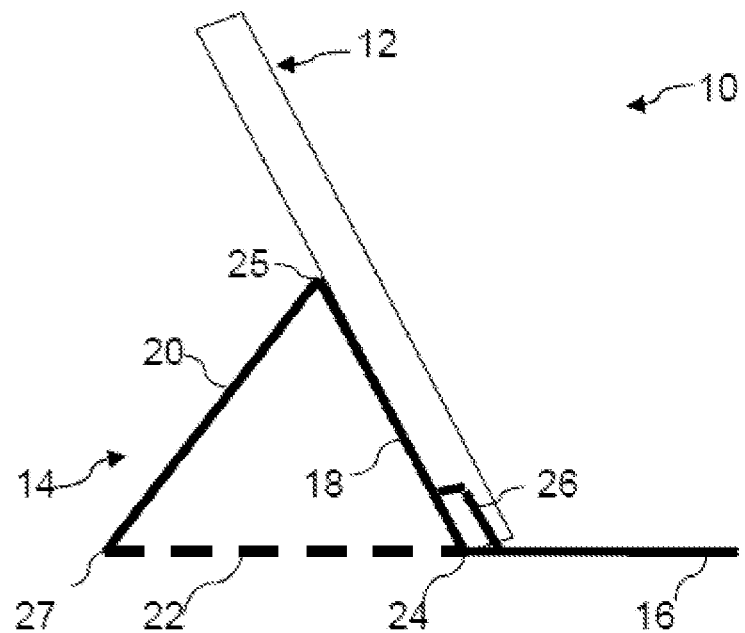
FIG. 1 is a side view of a tablet mounted in a stand in an embodiment of the invention.

Referring to FIG. 1 a combination 10 of a tablet 12 mounted in stand 14 is shown in a side view. Stand 14 as shown has three sections 16, 18, 20. Section 18 supports the tablet at a desired angle which may be adjustable. Sections 16, 18, 20 may preferably be a single piece construction, for example of plastic, with bendable connections 24, 25 between each section. This allows the stand to be folded flat for compact storage when traveling and/or dimensioned to be a cover for tablet 12. If used as a cover the stand may include means to attach to the tablet front, such as magnets or snap fit edges or edge portions (such as holders 26 illustrated below) or other known connection means allowing easy removal of the cover/stand. Bendable connection 24 allows section 16 to be reconfigured from a first position 22 indicated by the dashed line when near field communication is not needed to a second position in front of the tablet for near field communication at the front of the tablet, as shown by the solid line. Alternatively, however, if portability is not critical the sections 16, 18, 20 may be formed of a single solid piece, or only two pieces with section 16 pivotable about position 24 to provide a more solid base and allow the reconfiguration noted above. Also, more than three sections may be provided, for example, four sections may be provided with section 22 being a fourth section for stability and section 16 reconfigurable on top or below section 22 or 18, when in its first position. One or more of section joining positions 24, 25, 27 may be separable so the sections there are movable, not merely bendable, to adjust the stand configuration and tablet support angle. (The part of position 24 joining sections 16 and 18, however, is not separable unless provisions are made for coupling the embedded antenna across the separation, or through an additional section 22 via a transmission line, as discussed below. Also, in such an embodiment sections 22 and 16 may be a single piece with section 18 movable to adjust the stand angle.) Separable joining positions may include means to hold the sections in place, including recesses, magnets, snap fit or other means. Tablet 12 may rest against the stand or may be held in position by a holder 26 which may have a shape (including a shape extending around the tablet edge in a U shape to form a slot for the tablet edge or a snap fit design) and extension for desired stability. Alternatively, other means such as magnets may be employed to hold the tablet in place. The relative size of the sections may be varied and, for example, section 16 may be smaller (in length and/or in width).

Figure 2A:
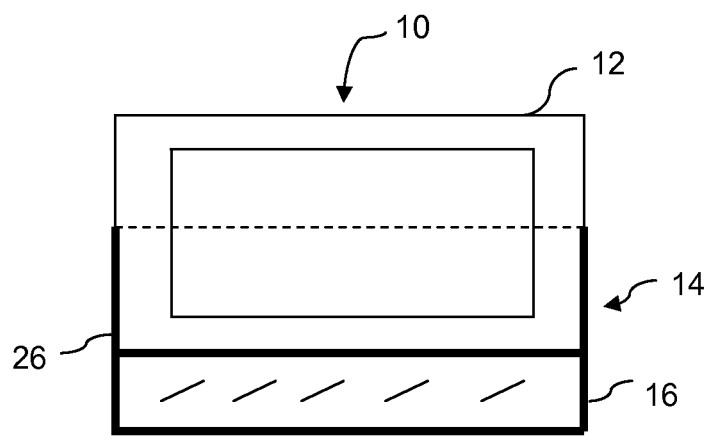
FIG. 2A is a front perspective view and FIG. 2B is a back view of a stand and tablet combination in an embodiment of the invention.
Figure 2B:
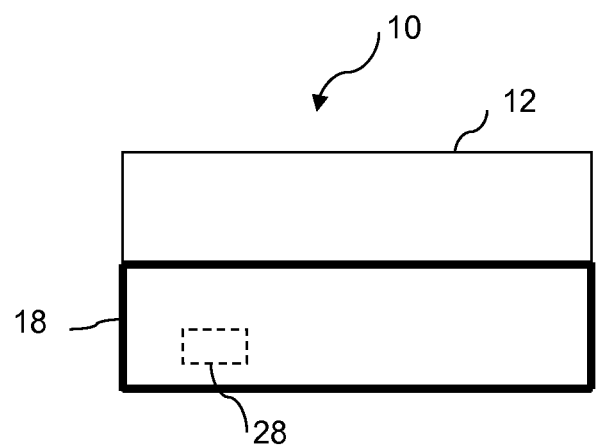

FIG. 2A is a front perspective view and FIG. 2B is a back view of stand and tablet combination 10. Shown in dashed lines in FIG. 2B is a schematic outline of the tablet near field communication antenna 28. Tablet 12 will also include appropriately designed near field reader circuitry. Antenna 28 may be any of various designs and may be a coil, for example and designed for resonance coupling at the near field communication frequency employed. For example, 13.56 MHz is commonly employed for near field communication using the ISO 14443 standard but various other frequencies and near field communication approaches are possible. Dimensions of antenna 28 may vary as well as shape so the shape and size shown is schematic in nature and for illustration purposes. As shown section 18 is configured to overlap with the antenna 28 position in the tablet. If the antenna 28 is configured at or near the top of device 12 section 18 will therefore extend up to the top of the back of the device or alternatively an additional section of the stand may be provided in this upper area, which is movably coupled to section 18. In such case an embodiment of antenna 30 with two separate near field inductive coupling portions connected by a transmission line, as described below in relation to FIG. 7 and FIG. 8 may be preferred for more efficient coupling. This transmission line may pass through the sections necessary to provide coupling at the desired position displaced from antenna 28, depending on the specific stand configuration.

Figure 3:
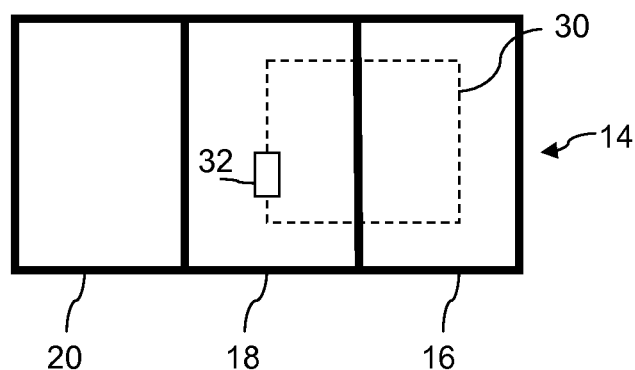
FIG. 3 is a top view of the stand shown with the sections folded into a flat configuration in an embodiment of the invention.
Figure 4A:
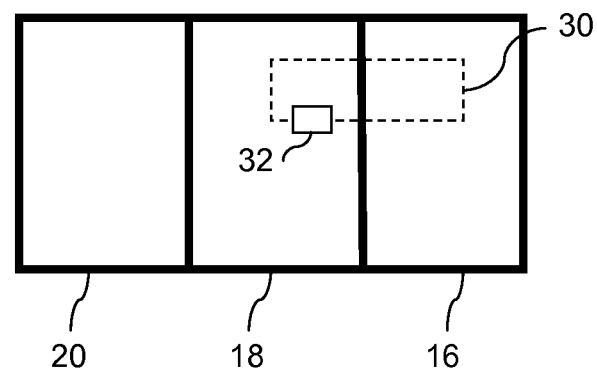
FIGS. 4A and 4B illustrate different stand antenna configurations and dimensions in embodiments of the invention.
Figure 4B:
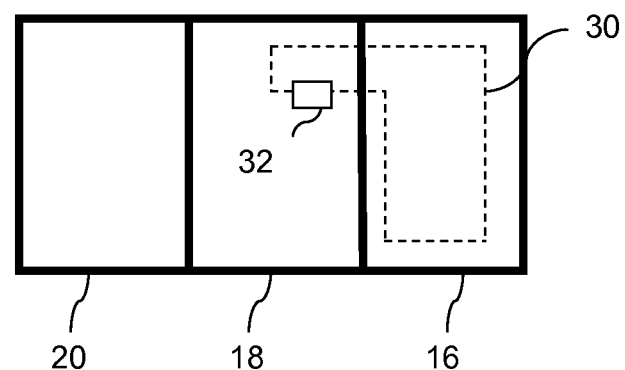

Referring to FIG. 3 the stand 14 is shown in a top view assuming the sections may fold into a flat configuration as described above. If not the view may be still generally be considered a top view (with relative dimensions and orientations altered accordingly) without affecting the general functional discussion. As shown by the dashed line a passive near field coupling antenna 30 is embedded in the stand sections 16 and 18. Antenna 30 may comprise a conductive coil printed or mounted on the sections or a suitable substrate to maintain a thin configuration for stand 14, especially for portable applications. A tuning circuit 32 is provided to match the resonant frequency to that of antenna 28 with one or more passive elements including a capacitor to form a resonant tank circuit along with the intrinsic antenna inductance. Design of the antenna for most effective coupling to antenna 28 may employ known near field antenna design teachings, such as in "The RFID Handbook", by Klaus Finkenzeller, 3$^{rd}$ Ed., Wiley Publishing, 2010, the disclosure of which is incorporated herein by reference. As will be appreciated from FIG. 2B and FIG. 3 the near field coupling antenna 30 will efficiently couple to the magnetic field from tablet antenna 28 and will preferably encircle the entire diameter of antenna 28 to capture substantially all the flux therefrom. The portion of antenna 30 on the front section 16 in turn will provide an efficient near field coupling area in front of the tablet. The antenna 30 area in section 16 and the antenna area in section 18, may be varied. For example, as shown in FIGS. 4A and 4B the antenna configuration in section 18 may be chosen to match the size of antenna 28 while the antenna size in section 16 may be varied up to substantially full width of section 16 as shown. The antenna Q factor, antenna coupling factor, communication bandwidth and resonance tuning frequency may be considered for optimizing the antenna parameters for the application.

Although section 16 is shown extending in a front bottom portion of the support surface of stand section 18, which is desirable for coupling to a keyboard, in other embodiments where coupling to other portable devices is desired, section 16 may extend to the side of the support surface to extend beyond the front of the tablet. Also, in such an embodiment section 16 may slide sideways into the stand section. Therefore, more generally, section 16 is movable in various ways along with near field coupling antenna 30 to extend the near field coupling to the portable device to be accessible at the front of the stand.

Figure 5A:
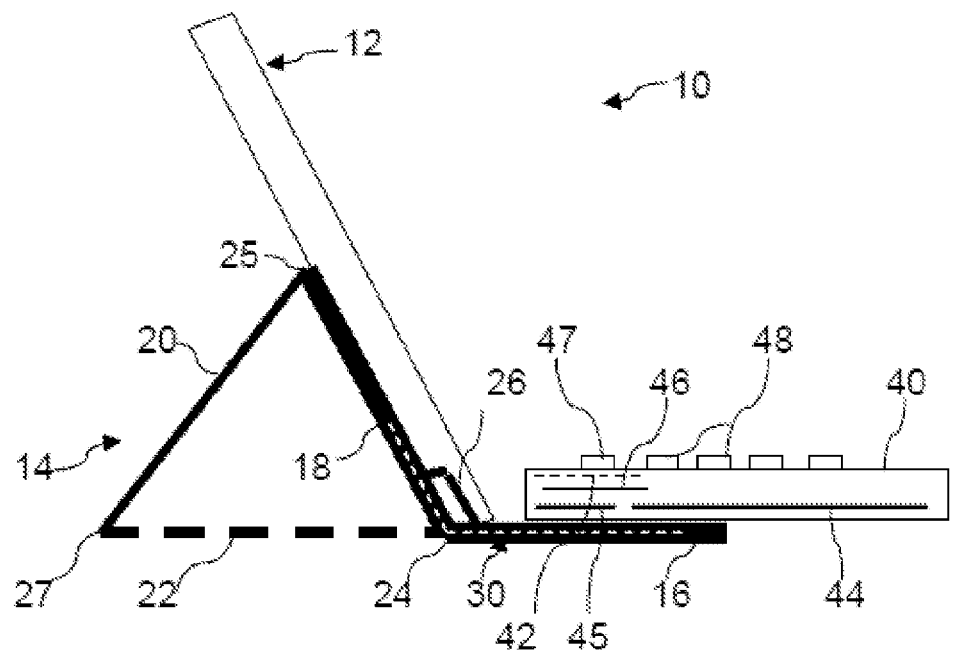
FIGS. 5A and 5B are side views of a tablet and stand in different configurations with a keyboard adapted for wireless near field communication with the tablet in an embodiment of the invention.

Referring to FIG. 5A, tablet 12 and stand 14 are shown configured with a keyboard 40 adapted for wireless near field communication with tablet 12. Keyboard 40 may employ the teachings of U.S. Pat. No. 7,006,014, the disclosure of which is incorporated herein by reference. Keyboard 40 will include one or more near field coupling antennas 42 which are coupled to modulating circuitry in the keyboard to communicate keystrokes to tablet 12, typically via load modulation detection in reader circuitry in tablet 12. Keyboard 40 preferably does not have a battery and the keyboard modulator circuitry is powered by the magnetic field from antenna 30. Separate antennas 42 may be provided for simultaneously activated keyboard tags/modulators. For example, separate row and column antennas may be provided which can be simultaneously independently modulated at different subcarrier frequencies to identify a key. Other examples are described in the '014 patent.

Figure 5B:
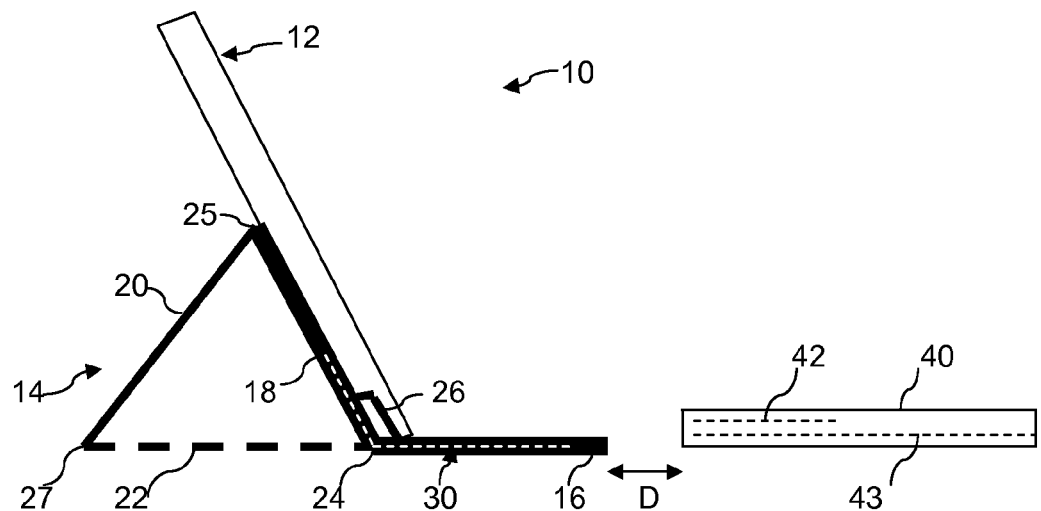
Figure 9:
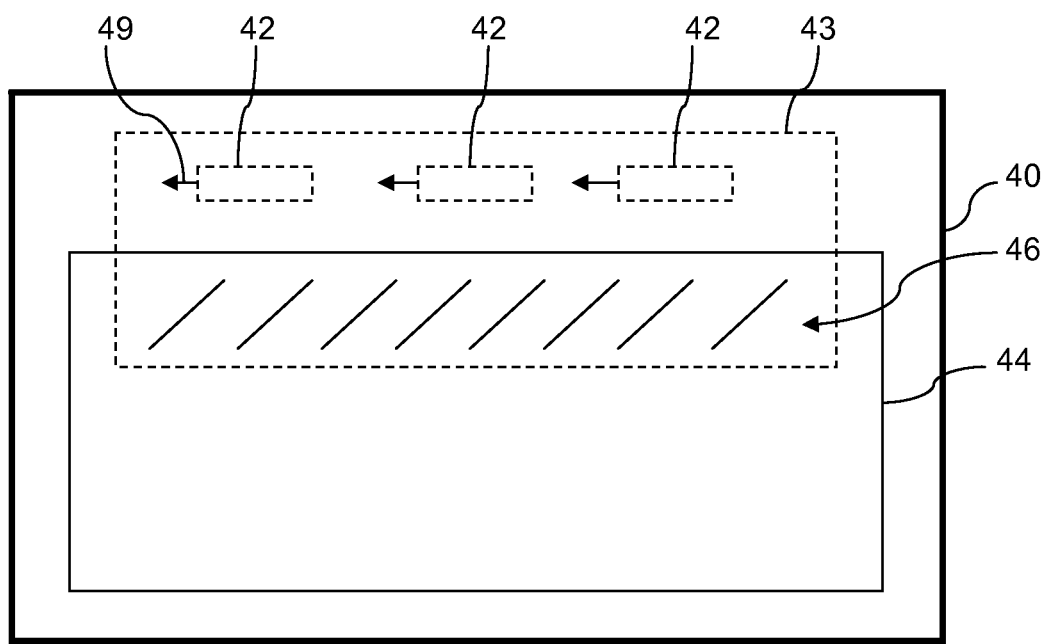
FIG. 9 is a top schematic drawing of a keyboard having a metal substrate for supporting thin profile keys and adapted for wireless near field communication in one embodiment of the invention.

In the configuration shown in FIG. 5A antenna(s) 42 overlap portion of antenna 30 in section 16 of the stand for good near field coupling via antenna 30 to tablet antenna 28. (Means may be provided to hold the keyboard in the stand 14 in this position if desired, for example, a side bracket on section 16, like bracket 26 described above, may be provided.) If the keyboard has thin profile keys, in particular keys commonly referred to as a scissor switch design, it may have a metallic substrate portion adapted for receiving the scissor switch keys 48, for example, a thin aluminum substrate 44. This metallic substrate may interfere with the inductive near field coupling and a nonmetallic portion 45 may be provided and the keyboard near field communication antenna 42 is configured over the nonmetallic portion 45. Non-scissor switch keys 47, such as function keys may be provided in this area. Alternatively, a ferrite material 46 may be provided between keyboard near field communication antenna 42 and the metallic substrate to reduce negative effects of the metal on the coupling. The ferrite material 46 may be a separate layer or a coating or part of the antenna structure 42. Also, while antenna 42 is shown above layer 44 it may be below the layer 44 with layer 46 in between. FIG. 5A is therefore highly schematic as many different configurations may be provided. Also, if the ferrite layer is provided adjacent or on the antenna 42 it will increase the antenna inductance and coupling factor allowing a reduced antenna size. This may be desirable allowing a more compact implementation of the antenna(s) in the keyboard and providing more area for the keys. The ferrite will affect coupling parameters to antenna 30 and circuitry 32 may be adjusted accordingly for desired communication. Keyboard 40, being wirelessly coupled, may be freely movable as shown in FIG. 5B with a representative distance D shown for illustration. Since tablet 12 has typically a relatively small screen a communication distance of comfortable use may be provided (the drawing is not to scale for illustration purposes). An additional coupling antenna 43 may be provided in keyboard 40 to enhance read range, as described in the '014 patent. This antenna may be un-modulated by any direct key coupling and may have different dimensions, Q factor and coupling factor than antenna 42; therefore this antenna in combination with passive coupling antenna 30 may thus enhance wireless near field communication with keyboard 40 and tablet 12 over a distance otherwise impractical to implement. Although shown below antenna 42, antennas 42 and 43 may be in a side by side relation. Also, antenna 43 may have a ferrite material over some or a portion thereof if it overlaps metal layer 44. Also, the antenna 43 may have a ferrite material and be relatively large while antenna(s) 42 may not, for example, antenna(s) 42 may be of smaller size and not configured over metal layer 44. One illustrative embodiment is shown in FIG. 9 with a large antenna 43 partially overlapping metal substrate 44 (preferably below substrate 44) and with partial ferrite layer 46 in the overlap region. Also, shown are three smaller antennas 42 coupled to the key modulated RFID tags as schematically shown by arrows 49. Three antennas 42 may allow independent row, column and multi-function key tag connections in an embodiment. Antenna(s) 42 may overlap antenna 43 as shown or may be beside antenna 43 as noted above. In an overlap configuration antenna 43 may enhance tag coupling parasitically whereas in a non-overlapping configuration a direct connection to the tag(s) power supply is preferably employed.

Figure 6A:
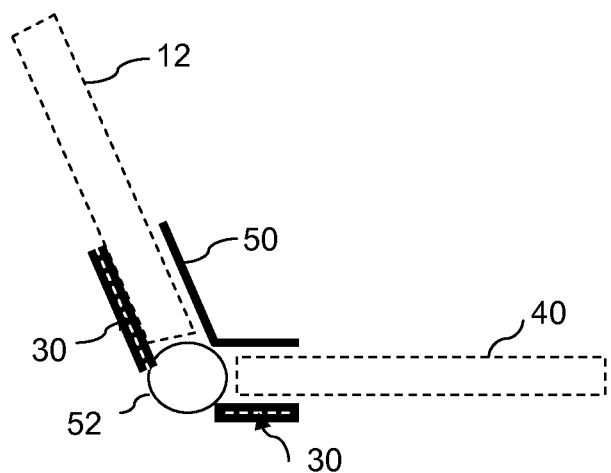
FIGS. 6A and 6B are side and front perspective views, respectively, of an alternative embodiment with a hinged bracket assembly, shown engaged with a tablet and keyboard adapted for wireless near field communication.
Figure 6B:
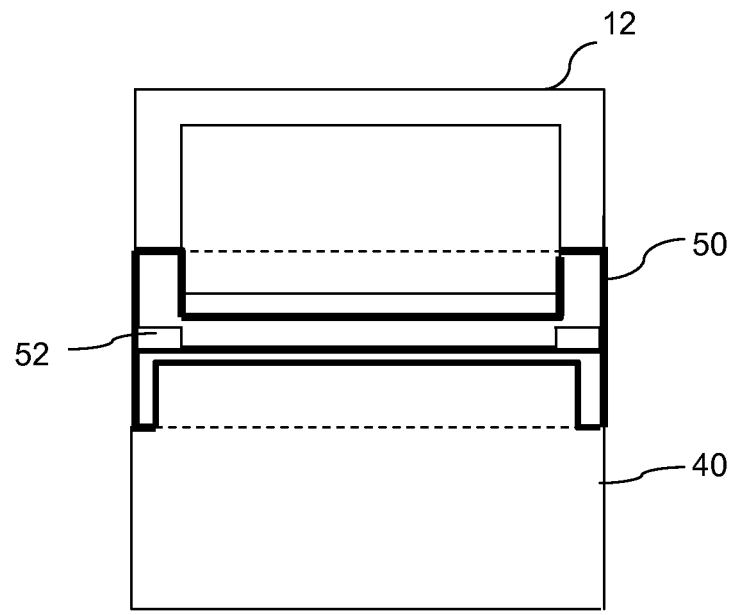

Referring to FIGS. 6A and 6B an alternative embodiment is shown with stand 14 replaced by a hinged bracket assembly 50, shown in side and front perspective views engaged with a tablet 12 and keyboard 40. The rotatable mounting bracket 50, with embedded antenna 30, near field enabled tablet 12, and passive keyboard 40 combination as provided is adapted for easily converting the tablet into a notebook type configuration. No direct electrical connections are required to tablet 12 or keyboard 40 to convert the tablet into a notebook configuration, the two devices may simply be inserted into the two sides of mounting bracket 50.

Bracket assembly 50 may include two rotatably connected slotted sections adapted to receive tablet 12 and keyboard 40, respectively. For example, rotatable connection may be via hinges 52 fixed to one section (e.g., bottom keyboard receiving section) and pivotably mounted to the other section. Other hinge designs are possible, however. Near field coupling antenna 30 may be configured across the two sections through hinges 52. For example, the top and bottom portions of the antenna of FIG. 3 may pass through the respective hinges 52.

In an embodiment, bracket assembly 50 may be integrated with keyboard 40 with a receptacle to receive tablet 12. In this case antenna(s) 42 (or 43) and 30 need not be separate antennas. Also, the rotatable assembly may be configured to rotate to a flat configuration aligned with the plane of the keyboard for portability. This flat configuration may be from folding the assembly 50 toward the keyboard to the sides or recesses therein, or to the front of the keyboard.

Figure 7:
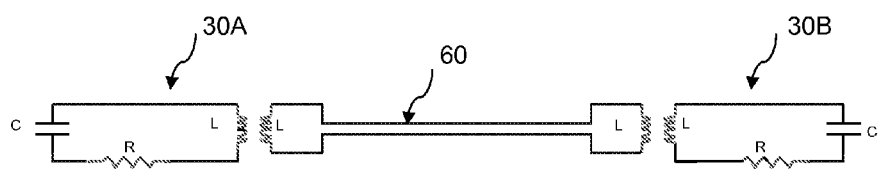
FIG. 7 is a schematic drawing of a transmission line coupling two antennas adapted for wireless near field communication.

Alternatively coupling antenna 30 may comprise two antennas 30A and 30B, on the tablet receiving and keyboard receiving sections of bracket 50, respectively, which are coupled together. For example, as shown in FIG. 7 a thin transmission line 60 may couple the two antennas 30A and 30B, through one of hinges 52. (Transmission line 60 may for example be designed to be 50 Ohms, but other designs are possible.) The coupling of the two antennas 30A and 30B to the transmission line is schematically shown provided by the inductor (loops) on the ends of the transmission line. Coupling may be implemented in various ways to provide efficient coupling and impedance matching.

Alternatively, the two antennas 30A and 30B may couple inductively through adjacent positioning of respective edge portions of the antenna coils at the mating edge of bracket assembly 50 so that no wiring need pass through hinge 52. Also, inductive coupling may be provided at the hinges. Also, near field coupling antenna 30A or 30B within one or both of hinges 52 may include a ferrite material to enhance coupling for a smaller coil geometry or if part of the hinge is composed of metal. Also, one hinge may include a ferrite material and coil and the other hinge a non-ferrite coil. For example, the ferrite coil may couple to antenna 43 and the non-ferrite coil to antenna(s) 42. Also, in an embodiment the coil may wind about a ferrite cylinder shaped piece forming part of the hinge spindle or axle.

Figure 8:
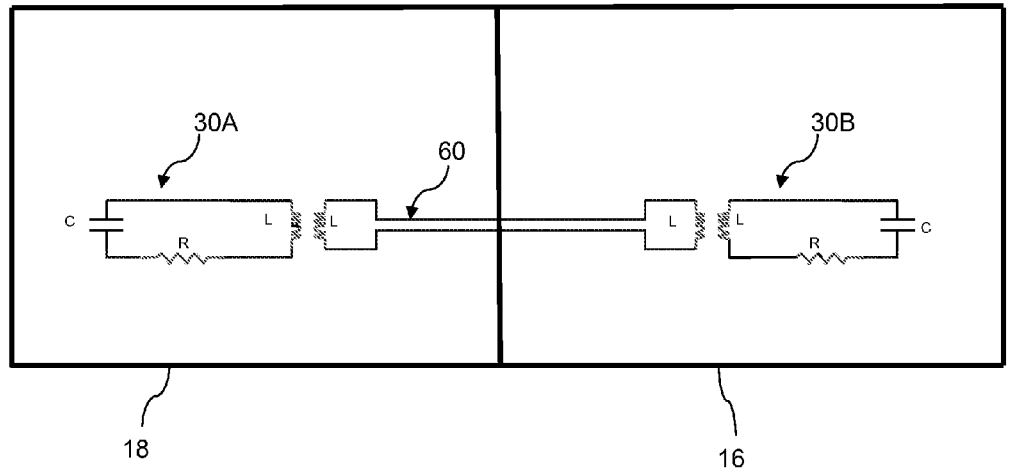
FIG. 8 is a schematic drawing of two sections of a stand with an embedded transmission line coupling two antennas adapted for wireless near field communication in one embodiment of the invention.

It should be noted that a two antenna design 30A, 30B may also be provided in the prior embodiments of stand 14 instead of a single antenna design (with direct inductive coupling or via a strip line as illustrated in FIG. 7 and FIG. 8). This may prevent antenna damage due to folding of the stand over time. Also, this may provide more efficient coupling where one or both of antenna portions 30A, 30B are desired to be smaller and spaced a distance apart.

The above embodiments are non-limiting and various modifications may be for specific implementations and such are within the scope of the invention. Also, the drawings are not to scale and are not meant to limit relative dimensions of illustrated components.

What is claimed is:

1. A keyboard adapted for near field communication, the keyboard having a front edge portion away from the user when oriented for use of the keys, comprising:
    a metallic substrate portion adapted to support thin profile keys;
    a plurality of thin profile keys configured on the metallic substrate portion;
    a substantially nonmetallic substrate portion adapted to support different type keys than said thin profile keys configured adjacent the front edge portion of the keyboard;
    one or more function keys configured on said substantially nonmetallic substrate portion;
    a near field coupling antenna configured on said substantially nonmetallic substrate portion; and
    a device holder for receiving a removable computer device with a display, wherein said device holder is rotatable;
    wherein said near field coupling antenna is inductively coupled to a second near field coupling antenna configured in part of said rotatable device holder.

2. A keyboard as set out in claim 1, wherein said thin profile keys comprise scissor switch keys.

3. A keyboard as set out in claim 1, wherein said device holder is removably coupled to the keyboard.

4. A keyboard as set out in claim 1, wherein said device holder is fixed to the keyboard.

5. A keyboard as set out in claim 1, wherein said nonmetallic substrate portion and said near field coupling antenna are configured adjacent said device holder.

6. A keyboard adapted for near field communication, comprising:
- a metallic substrate portion adapted to support thin profile keys;
- a plurality of thin profile keys configured on the metallic substrate portion;
- a substantially nonmetallic substrate portion adapted to support different type keys than said thin profile keys;
- one or more function keys configured on said substantially nonmetallic substrate portion;
- a device holder for receiving a removable computer device with a display; and
- a near field coupling antenna configured on said substantially nonmetallic substrate portion, wherein said near field coupling antenna is configured in part in said device holder.

7. A keyboard as set out in claim 6, wherein said thin profile keys comprise scissor switch keys.

8. A keyboard as set out in claim 6, wherein said device holder is removably coupled to the keyboard.

9. A keyboard as set out in claim 6, wherein said device holder is fixed to the keyboard.

10. A keyboard adapted for near field communication, the keyboard having a front edge portion away from the user when oriented for use of the keys, comprising:
- a metallic substrate portion adapted to support thin profile keys;
- a plurality of thin profile keys configured on the metallic substrate portion;
- a substantially nonmetallic substrate portion adapted to support different type keys than said thin profile keys configured adjacent the front edge portion of the keyboard;
- one or more function keys configured on said substantially nonmetallic substrate portion;
- a near field coupling antenna configured on said substantially nonmetallic substrate portion; and
- a device holder for receiving a removable computer device with a display, wherein said device holder is rotatable;
- wherein said near field coupling antenna is inductively coupled to a transmission line configured in said rotatable device holder.

11. A keyboard as set out in claim 10, wherein said rotatable device holder has first and second parts rotatable relative to each other and wherein said transmission line is connected to said first and second parts.

\* \* \* \* \*